J. F. O'CONNOR.
INDICATOR.
APPLICATION FILED NOV. 10, 1915.

1,225,996.

Patented May 15, 1917.
2 SHEETS—SHEET 2.

WITNESS
Wm. Geiger

INVENTOR.
John F. O'Connor
BY George J. Haight
HIS ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

INDICATOR.

1,225,996.        Specification of Letters Patent.        Patented May 15, 1917.

Application filed November 10, 1915. Serial No. 60,687.

*To all whom it may concern:*

Be it known that I, JOHN F. O'CONNOR, a citizen of the United States, residing at Chicago, in the county of Cook and State of Illinois, have invented a certain new and useful Improvement in Indicators, of which the following is a full, clear, concise, and exact description, reference being had to the accompanying drawings, forming a part of this specification.

This invention relates to improvements in indicators.

One object of the invention is to provide simple and accurate means, used in conjunction with a proper table of blows, for ascertaining the characteristics of certain types of curves.

More specifically, my invention contemplates the provision of simple means for reading a diagrammatic curve which corresponds to the movements of a falling weight acting upon a shock absorbing device such as a draft gear, said means being so designed that by properly applying the same to the curve, the maximum blow absorbed by the shock absorbing device or the maximum rate of retardation of the falling weight produced by the shock absorbing device acting thereon, can be readily determined.

In my co-pending application, Serial Number 38,111 for improvement in means for recording actions of railway draft gears, filed July 6th, 1915, is disclosed a suitable arrangement for obtaining the curves which indicate the movements of the falling weight and the action of the draft gear in resisting the same, and reference is hereby made to said application in order that a clearer understanding of the means and method by which the curves are obtained may be had.

Figure 1:
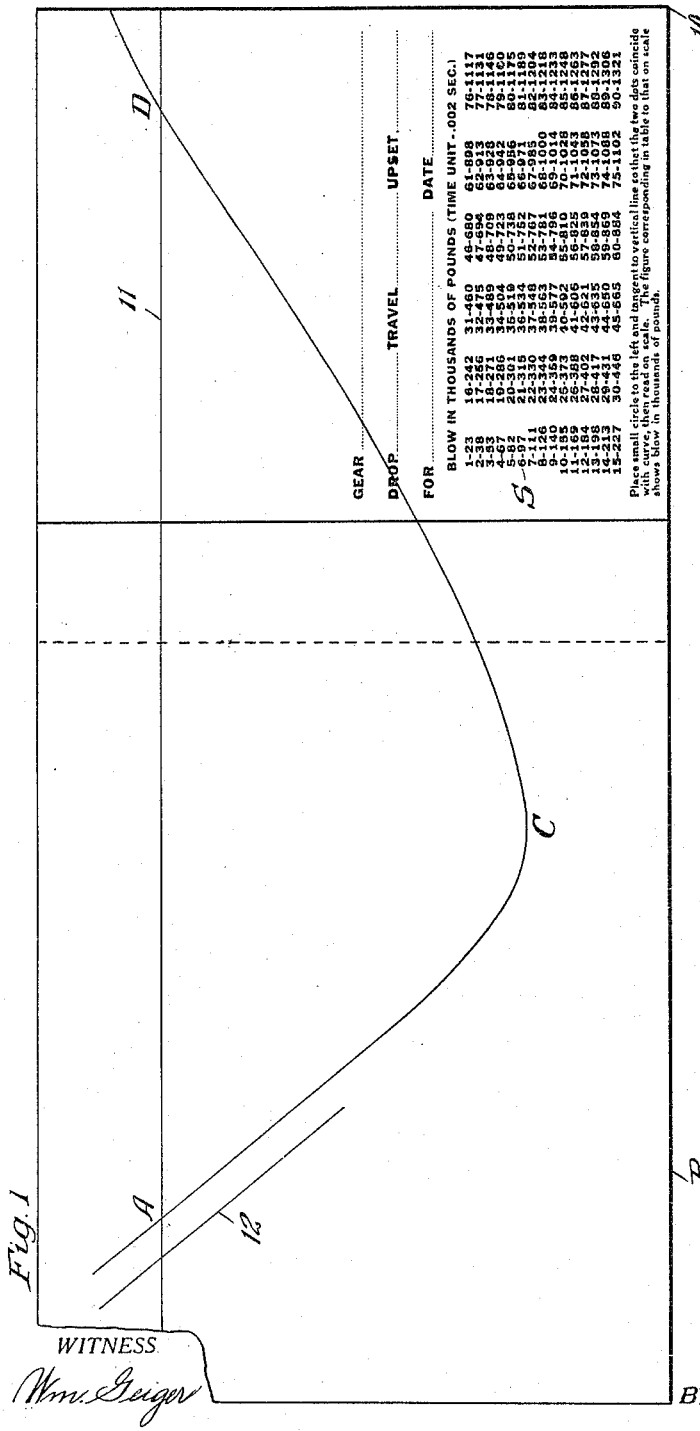
Figure 2:
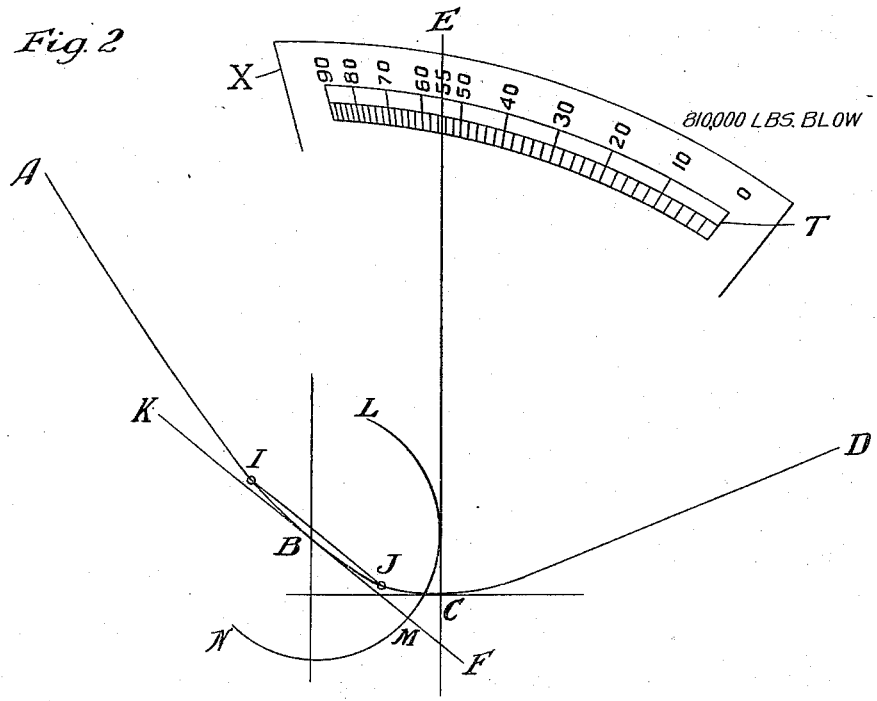
Figure 3:
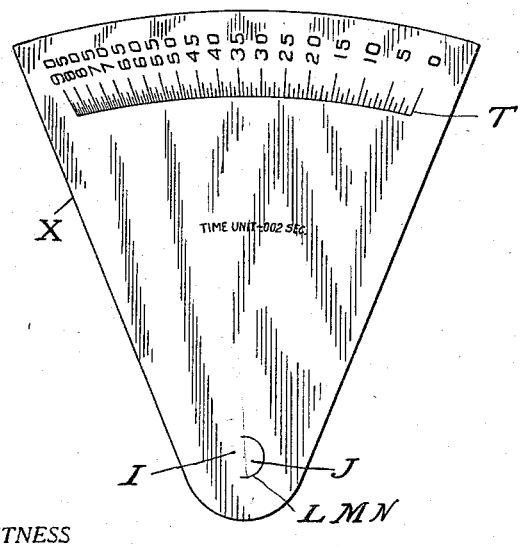

In the drawing forming a part of this specification, Figure 1 illustrates a typical card such as is obtained by means of the mechanism described in my said application 38,111, said card having thereon a time curve and a curve corresponding to the movements of the falling weight, as described more particularly hereinafter. Fig. 2 is a diagrammatic view illustrating the manner in which the improved indicator is made and applied. And Fig. 3 is a view of the indicator, *per se.*

Referring now to Fig. 1, R represents a record sheet of paper or other suitable material similar to those used with my recording mechanism described in said application 38,111, the record paper having been removed from the recording cylinder and then cut along the line 10 and laid out in the flat as indicated in Fig. 1. On said record sheet R, is printed a table of calculations S, said table having a series of index numerals ranging from 1 to 90, and corresponding blows designated in thousands of lbs. for each of said index numbers. Said recording sheet R may also be provided with suitable designations to indicate the class of railway draft gear tested, the amount of movement of the parts of the gear, the distance through which the weight falls or drops, the person or company for whom the test is made, the date of the test, and by whom the test is made. On said record sheet R, 11 denotes the base line or position at which the falling weight of the drop hammer by which the test is made, engages the draft gear. The line 12 is the "time line" by which the surface speed of the cylinder or record sheet is determined during the actual process of making the gear performance curve A, C, D. The method of making the time curve 12 and performance curve A, C, D, is clearly described in my said application 38,111. It will be sufficient to say that that part of the performance curve from A to C corresponds to that portion of the action of the draft gear from the time the falling weight first contacts therewith until the weight has been brought to rest or zero movement at C. From C to D, indicates the action of the gear during the recoil or recovery, that is, from the time the weight was brought to rest at C and is started upwardly again under the influence of the stored energy in the gear.

Referring now more particularly to Fig. 2, it will be apparent that the work performed by the gear in stopping the falling weight occurs from A to C, the latter point being the lowermost point on the curve A, C, D, and where the curve changes from a downward direction to an upward direction. If now, any point is taken in the curve A, C, such as B, and a tangent is drawn to that point, as K, F, said tangent when projected downwardly will intersect the line E, C, at some point below the point C, as indicated at F. It is evident that the line B, F, corresponds to the line which would be described by the recording pencil if all retarding forces acting upon the falling weight were eliminated at the instant the falling weight reaches a point in its downward travel corresponding to the point B in the curve A, B, C, D. Inasmuch, however, as the falling weight continues to be acted upon by the draft gear after the weight passes the point B, and the weight is finally brought to rest at the point C, it is evident that the forces acting upon the falling weight have caused the latter to be retarded a distance corresponding to the distance C, F. Knowing the distance C, F, the time within which the retardation corresponding to C, F, has been produced in the falling weight while traveling from B to C and the weight in lbs. of the falling weight, it is evident that the forces acting upon the falling weight to retard the same at the point B, can be ascertained.

As will be understood by those skilled in the art, the main object in determining the performance of a gear or shock absorbing device while being actuated, is to ascertain the maximum force which the gear is required to exert in bringing the falling weight to rest. From observations made during a great many tests, it has been found that this condition arises at from .001 to .003 of a second before the falling weight has reached its lowermost position or was brought to rest. In view of this, the indicators, hereinafter described, are designed preferably on a basis of time units of .001 and .002 of a second. In Figs. 2 and 3, the indicator X has a time unit of .002 of a second. The indicator X is preferably a transparent member of celluloid or other suitable material and cut to substantially sector shape. The indicator, near its lower end, is provided with an arc of a circle L, M, N, the center of which is at a point midway between the dots I and J, the latter being on a diameter of the circle and equidistant from the center thereof, for a purpose hereinafter described. The radius of the arc L, M, N, corresponds to the unit of time selected. In the present instance, where the unit of time is .002 of a second, the radius will be .16⅔ of an inch. This distance, .16⅔ of an inch which is the radius of the arc L, M, N, is the lineal distance traveled by the surface of the record sheet R during .002 of a second, while the record is being made.

Referring again to Fig. 2, to use the indicator X, the vertical line E, C, is drawn through the lowermost point of the curve A, B, C, D, as hereinafter described. The indicator X is then applied to the curve with the arc L, M, N, kept tangent to the line E, C. The indicator X with the arc L, M, N, thereon is so manipulated that while keeping the arc L, M, N, tangent to the line E, C, the two dots I and J are brought exactly over the curve A, B, C. When this has been done, it will be found that the vertical line E, C, passes through the index scale T at a certain point therein. As illustrated in the drawing, this point corresponds to the index 55. The lines of the index scale T, which extend from zero to 90 all correspond to the tangents drawn to the arc L, M, N, which tangents are located in the following manner. The tangent through the zero point of the scale T is perpendicular to the base line or diameter, I, J. The tangent to the arc, L, M, N, which extends through the index 55 of the scale T is found by turning the arc L, M, N, to such an amount that the tangent K, B, F, to the point B, will intersect the line E, C, at a point below C, which corresponds to 55 predetermined units of displacement. Similarly, if the arc L, M, N, is turned so that the tangent K, B, F, intersecting the line E, C, at say, only 20 predetermined units of displacement below the point C, then the vertical line E, C, would intersect the scale T through the index 20. The other points on the scale T are determined in the same manner. As will be understood, the index scale T corresponds to the index numbers 1 to 90 on the table S, so that the blow corresponding to the index 55, in the illustrated position of the indicator X in the drawing, is 810,000 lbs., which is determined from the table S.

From the preceding description, it will be seen that no matter what the angular position of the indicator X is, so long as the arc L, M, N, is tangent to the line E, C, the center of the arc L, M, N, will always be in a vertical line to the left of the line E, C, a distance equal to the radius of the arc L, M, N, which distance corresponds to the unit of time selected. Hence, by applying the indicator in the manner herein before described with the dots I, J, on the curve A, B, C, the point B will always be the same distance from the line E, C. By locating the points I, J, in or over the curve A, B, C, the tangent to the point B of the curve is determined and hence, from this can be found the amount which the falling weight is displaced while traveling from B to C, which corresponds to the distance C, F. Knowing thus the amount of displacement, and the unit of time required, the indicator can be used in the manner hereinbefore described.

I claim:

1. An indicator of the character described comprising a member having an index scale and an arc of a circle thereon, the lines forming the scale corresponding to angles between a series of tangents to said arc and one of the diameters of said circle.

2. An indicator of the character described, comprising a member having an arc of a circle described thereon, the radius of said circle corresponding to a predetermined unit of time, said member having two points indicated thereon and located on a diameter within the arc of said circle, said points being located equi-distant from the center of said circle, and indicia corresponding to the angles between the diameter located by said points and a series of tangents drawn to said arc.

3. An indicator of the character described, comprising a member having an arc of a circle described thereon, the radius of said circle corresponding to a predetermined unit of time, said member having two points indicated thereon located within the arc of said circle and on a diameter thereof, and an index scale which is determined by a series of tangents to said arc, the zero point of said scale corresponding to the tangent perpendicular to said diameter.

4. An indicator of the character described, comprising a transparent member having a circle described thereon, said circle being adapted to be placed tangent to a vertical line passing through the zero point of a described curve, said member being provided with means locating a diameter of said circle, said diameter paralleling a tangent to said curve at a point located a predetermined distance from said vertical line, said member having also a scale thereon indicating the number of predetermined units of displacement on said vertical line between the point where it intersects said curve and where said tangent, if projected, would intersect said vertical line.

In witness that I claim the foregoing I have hereunto subscribed my name this 4th day of November 1915.

JOHN F. O'CONNOR.

Witness:
JOSEPH HARRIS.

Copies of this patent may be obtained for five cents each, by addressing the "Commissioner of Patents, Washington, D. C."